United States Patent [19]

Lund

[11] Patent Number: 5,137,417
[45] Date of Patent: Aug. 11, 1992

[54] WIND ENERGY CONVERSION SYSTEM

[76] Inventor: Arnold M. Lund, 1210 Avocado Ave., San Diego, Calif. 92026

[21] Appl. No.: 713,867

[22] Filed: Jun. 12, 1991

[51] Int. Cl.$^5$ ............. F03B 15/06; F03D 9/00; H02P 9/04

[52] U.S. Cl. ............. 415/4.1; 415/4.3; 415/4.5; 415/905; 415/908; 416/9; 416/13; 416/14; 416/176; 290/44; 290/55

[58] Field of Search ............. 415/2.1, 4.1, 4.3, 71, 415/72, 4.5, 3.1, 905, 908; 416/9, 11, 13, 14, 176; 290/43, 44, 54, 55

[56] References Cited

U.S. PATENT DOCUMENTS

| | | |
|---|---|---|
| 1,342,206 | 6/1920 | Hansen-Ellehammer ............ 416/11 |
| 2,068,792 | 1/1937 | Dekker . |
| 2,137,559 | 11/1938 | Algee . |
| 2,294,009 | 8/1942 | Umhoefer . |
| 2,339,602 | 1/1944 | Hagen . |
| 2,407,816 | 9/1946 | Ccerner . |
| 3,059,834 | 10/1962 | Hausammann . |
| 3,128,939 | 4/1964 | Szydlowski . |
| 3,168,048 | 2/1965 | Toyokura . |
| 3,228,475 | 1/1966 | Worthmann . |
| 3,561,883 | 2/1971 | Berry . |
| 3,820,916 | 6/1974 | Agushev . |
| 4,021,135 | 5/1977 | Pedersen . |
| 4,120,152 | 10/1978 | Jackson, III ............ 415/72 |
| 4,140,433 | 2/1979 | Eckel . |
| 4,340,822 | 7/1982 | Gregg . |
| 4,350,898 | 9/1982 | Benoit ............ 290/44 |
| 4,443,155 | 4/1984 | Smith . |
| 4,450,364 | 5/1984 | Benoit ............ 290/55 |
| 4,585,950 | 4/1986 | Lund ............ 290/55 |
| 4,648,787 | 3/1987 | Brünig et al. ............ 415/72 |
| 4,678,923 | 7/1987 | Trepanier ............ 290/55 |

FOREIGN PATENT DOCUMENTS

| | | | |
|---|---|---|---|
| 128604 | 8/1948 | Australia ............ | 415/72 |
| 57367 | 3/1911 | Austria ............ | 415/72 |
| 105536 | 2/1927 | Austria ............ | 290/55 |
| 8201399 | 4/1982 | PCT Int'l Appl. ............ | 290/55 |

*Primary Examiner*—Thomas E. Denion
*Attorney, Agent, or Firm*—Terry M. Gernstein

[57] ABSTRACT

A wind energy conversion system includes specially shaped blades mounted in a specific location on a specially shaped blade-supporting body to maximize energy conversion from wind energy to electrical energy. The blade-supporting body includes a concave section located upstream of a convex section, with the two sections being joined together at a location of maximum diameter. The blades are mounted on the body at the location of maximum diameter. Each blade includes two surfaces each of which includes a concave section and a convex section. The blade surfaces are spaced apart from each other by a blade thickness dimension that increases from essentially zero at blade tips to a maximum adjacent to a blade longitudinal axis that extends from a blade proximal end mounted on the blade-supporting body to a distal end spaced from said blade-supporting body.

12 Claims, 5 Drawing Sheets

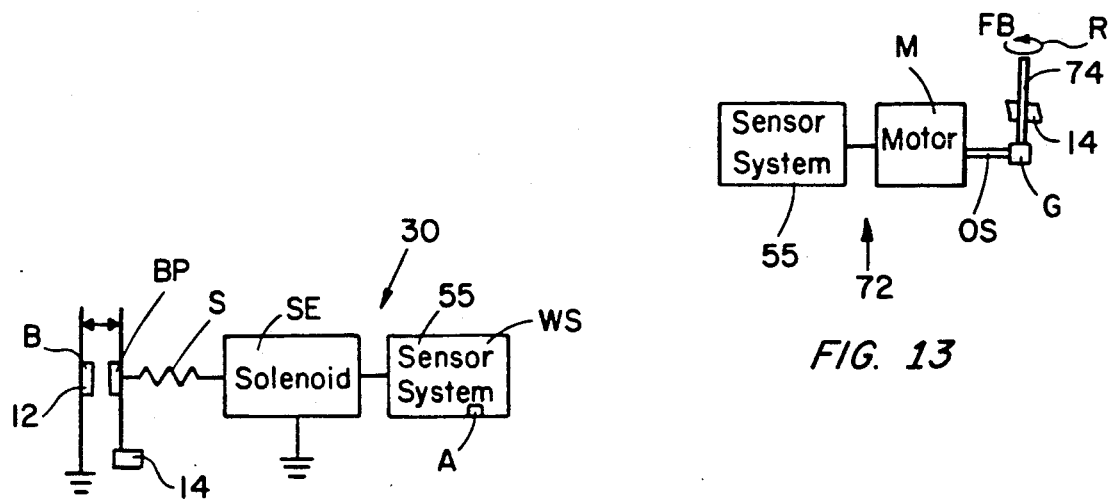
FIG. 12
FIG. 13
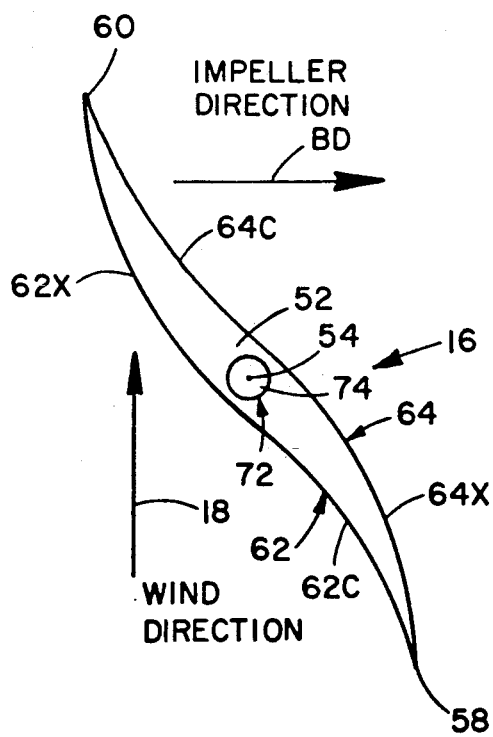
FIG. 7

WIND ENERGY CONVERSION SYSTEM

TECHNICAL FIELD OF THE INVENTION

The present invention relates to the general art of energy conversion systems using primary replaceable sources of energy, and to the particular field of wind energy conversion systems.

BACKGROUND OF THE INVENTION

A wind energy conversion system (WECS) is any of a variety of mechanisms that are operated by the force of wind against blades or sails that are mounted on a support body that is, in turn, mounted for rotation about a shaft. Wind flowing past the WECS causes the blades to rotate, and such rotation is transferred to an electrical generating means whereby the WECS converts wind energy into electrical energy. WECSs have been proposed and built in a wide variety of types, types such as horizontal axis head on, vertical axis and the like.

While wind energy is considered to be a primary replaceable source of energy, wind energy conversion has not achieved its fullest use for many reasons. These reasons include economics, noise, safety, television interference, and aesthetics, among others. However, one principal reason for such lack of popularity is associated with the low efficiency with which WECSs have converted wind energy into electrical energy.

This low efficiency often manifests itself in large, noisy WECSs that can only be located at special sites. In fact, site location is an important drawback and consideration in WECS design. Wind conditions as well as proximity to population become extremely important design considerations associated with the present WECSs. Such design considerations often limit, or even obviate, the use of WECSs to generate power.

The present inventor has observed that the inefficiency with which present WECS designs convert wind energy to electric power is associated with several design characteristics of such present WECSs. These design characteristics include support body shape, blade shape as well as blade location on the support body.

In the past, the blades of a WECS have been straight, that is, similar in shape to the blade illustrated in FIG. 1. The shape of the prior blades has inhibited the efficiency of the energy conversion process in many situations. In some instances, the blade is erroneously oriented with respect to the wind, and thus is inefficient for one situation while being efficient for another. It has also been found that these present blades are subject to a variety of extraneous loads, that result in lead-lag motions, flapping and/or pitching. These motions generally reduce the efficiency of a WECS, and may cause damage to the machine. Such motions may also influence the overall design of the WECS in an adverse manner. Furthermore, the blade shape and orientation of present WECSs does not make efficient use of the wind energy in many situations, situations such as varying wind conditions that vary over the blade as an entity or at various locations on the blade. The blade shape and orientation may also create turbulence, or like air flow disruptions adjacent to the blade. Such air flow disruptions can inhibit the efficiency of a WECS.

In addition to being straight, many of the prior art WECS blades are located in a position on the supporting body that prevents the blades from being as efficient as possible. For example, some blades are located at the up-wind location on the body as illustrated in FIG. 2, while others are located at the down-wind end of the supporting body as illustrated in FIG. 3. The inventor has found that locating the blades as illustrated in FIGS. 2 or 3 does not make the most efficient use of the air flowing past the system, and, in some instances, may even inhibit the efficiency of the overall device. In fact, the inventor has found that, in addition to failing to make the most efficient energy conversion, the location and shape of the blades on present WECSs may actually exacerbate inefficient operation in some situations.

Therefore, there is a need for a wind energy conversion system that makes more efficient use of wind energy than presently-available wind energy conversion systems. Specifically, there is a need for such a WECS that has the blade-supporting body thereof and the blades thereof designed to operate in the most efficient manner for a wide variety of situations.

OBJECTS OF THE INVENTION

It is a main object of the present invention to provide a wind energy conversion system that has the efficiency thereof improved over presently-available WECSs.

It is another object of the present invention to provide a wind energy conversion system that has the blade-supporting body thereof designed to improve the efficiency of the WECS.

It is another object of the present invention to provide a wind energy conversion system that has the blades thereof designed and located on the blade-supporting body to make efficient conversion of wind energy into electrical power.

It is another object of the present invention to provide a wind energy conversion system that has the power production thereof improved over presently-available WECSs.

SUMMARY OF THE INVENTION

These, and other, objects are achieved by a wind energy conversion system having specially shaped blades located at specific positions on a specially shaped blade-supporting body. The blades are shaped and oriented to maintain an angle of attack with respect to the wind that is always the most effective to maximize the efficiency of the energy conversion from the wind to the blade even when the blade is operating. The blades are also mounted on the body in a location that increases the velocity of air flowing past the blade and tends to reduce turbulence adjacent to the blades.

Specifically, each blade is S-shaped with two concave-convex surfaces, and has a thickness dimension that varies from essentially zero (a point) at both tips of the blade to a maximum at the center of the blade. Most specifically, the blade is in the shape of an ogee, and is oriented to have a concave surface upstream of a convex surface related to wind direction.

The shape and orientation of the blades and the location of the blades on the supporting body reduces drag and turbulence associated with each blade. Such reduction in drag and turbulence not only increases efficiency of the WECS, it also permits the WECS of the present invention to use more blades and greater surface area than prior art WECSs. Increasing the number of blades, without a concomitant increase in drag and turbulence, will increase the efficiency and power production of the WECS of the present invention.

The blades are mounted on a double-cone shaped body having a conical leading section that diverges from an upstream-facing apex to a location of maximum diameter located downstream of the upstream-facing apex. The blade supporting body also includes a conical trailing section that converges from the location of maximum diameter towards a downstream-facing apex. The blade-supporting body is continuous so that no flow disruptions occur along the surface thereof. The blades are located at the location of maximum diameter whereby air flow velocity is maximum at the blades, yet, due to the shape of the blade-supporting body, air flow turbulence at the blades will be reduced from prior art designs. Such reduction in turbulence will increase the efficiency and reliability of the blades as well as the overall system, while also permitting use of more blades or impellers.

The system of the present invention further includes power take off means and brake means as well as means for adjusting the angle of attack of the blades with respect to the wind flowing past the WECS based on wind conditions and speed.

BRIEF DESCRIPTION OF THE DRAWING FIGURES

FIG. 7 illustrates a blade of the WECS of the present invention.

FIG. 12 illustrates a braking system that can be used to control the speed of rotation of the blade-supporting body of the WECS of the present invention.

FIG. 13 illustrates a pitch angle adjusting system that can be used to adjust the orientation of the blades of the WECS with respect to the direction of the wind flowing past the WECS.

DETAILED DESCRIPTION OF THE PREFERRED EMBODIMENT OF THE INVENTION

Figure 1:
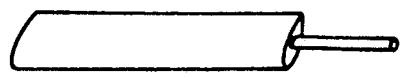
FIG. 1 illustrates a prior art WECS blade.
Figure 2:
FIG. 2 illustrates a prior art up-wind location for WECS blades.
Figure 3:
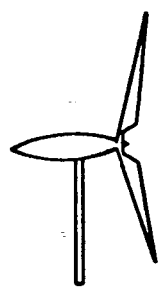
FIG. 3 illustrates a prior art down-wind location for WECS blades.
Figure 4:
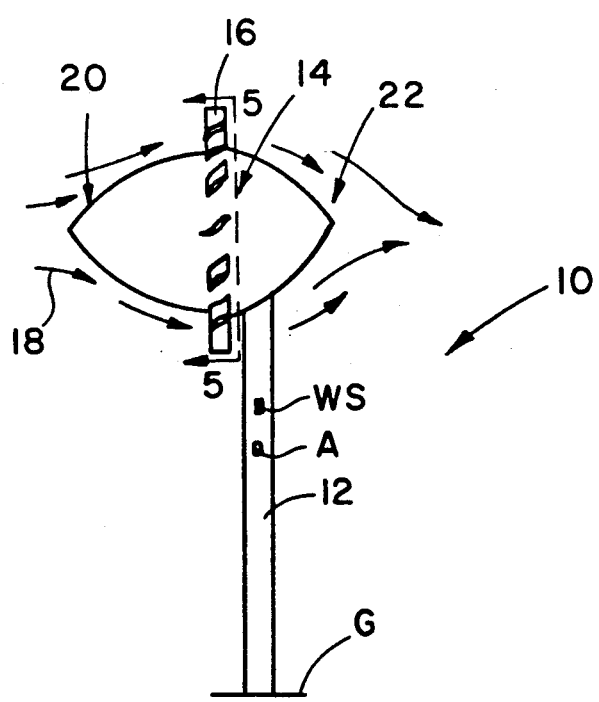
FIG. 4 illustrates a side elevational view of a WECS embodying the present invention.
Figure 5:
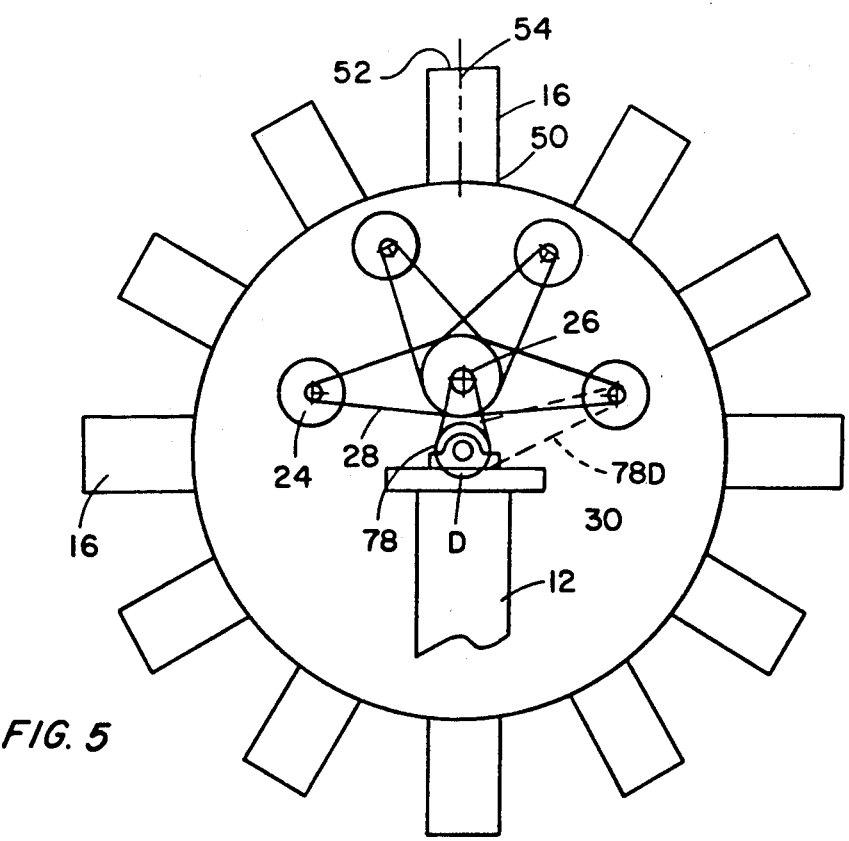
FIG. 5 illustrates a rear end elevational view of the WECS of the present invention taken along line 5—5 of FIG. 4.
Figure 9:
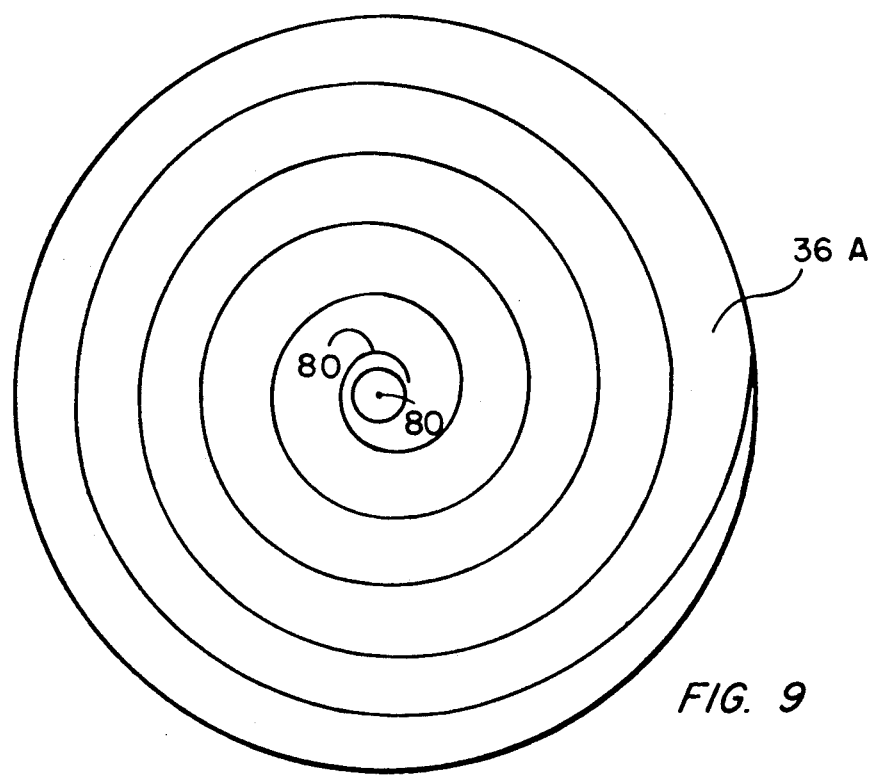
FIG. 9 illustrates an end elevational view of the FIG. 8 embodiment.
Figure 8:
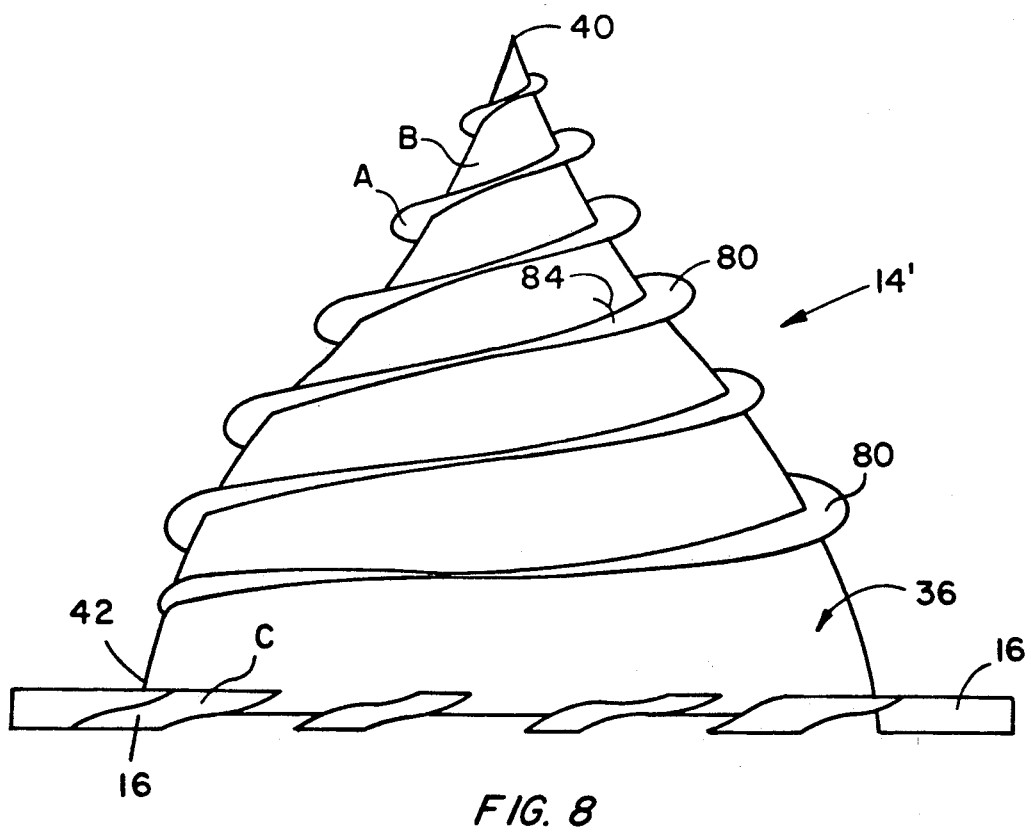
FIG. 8 illustrates an alternative embodiment of the WECS of the present invention.

Shown in FIGS. 4 and 5 is a wind energy conversion system 10 embodying the present invention. The system 10 includes a support element 12 mounted on the ground G and extending upwardly therefrom. A blade-supporting body 14 is mounted on a top end of the supporting element 12, and a plurality of blades, such as blade 16, as well as other configurations of impellors, are mounted on the supporting body 14. Air flows past the blade-supporting body 14, as indicated by arrows 18. For the sake of convenience, the air flow direction will be used to orient positions on the WECS 10, with the blade-supporting body having an upstream location 20 and a downstream location 22. Air flowing past the WECS 10 has flow energy, and the WECS 10 converts this flow energy into electrical energy. This conversion includes operating one or more electrical power generators, such as generator 24 connected to a shaft 26 of the blade-supporting body by a drive belt 28. It is also noted that the satellite generators may be driven directly by gears or belts or by the main shaft 78 as well. Rotation of the blade-supporting body causes rotation of the generators 24, and the rotation of the generators 24 is used to generate electrical power in a manner known to those skilled in the art. The exact details of the generator system will not be presented herein as such details are known to those skilled in the art from disclosures such as U.S. Pat. No. 4,585,950, the disclosure of which is incorporated herein by reference.

Rotation of the blade-supporting body is also controlled by a brake means 30. The brake means 30 is also shown in FIG. 12, and includes a brake disk B fixedly mounted on the support element 12 and a brake pad BP mounted on the blade-supporting body 14. Spring-biased element S bias the brake pad away from the brake disk, and further lever and solenoid elements SE are connected to the brake pad to force that brake pad into frictional engagement with the brake disk when rotation of the blade-supporting element is to be controlled or stopped. The lever and solenoid elements can be controlled manually or electrically from a remote location or from adjacent to the blade-supporting element as suitable, with the control means being indicated by block SS. The exact details of the braking system will not be presented herein, as pad and disk brake systems are known in many fields, including land vehicles, and solenoid operation is well understood by those skilled in the art. The sensor system SS can include wind direction sensors WS mounted on the support element 12 and an anemometer A also mounted on the support element 12. These wind condition sensor elements can be located at other convenient locations on the WECS 10 as well, including on the blade-supporting body, if suitable. It is also noted that since the impellers are attached to a large disk, this disk can replace the braking disk on conventional machines. Because of the larger size, the brake pads can be placed further from the center which gives more leverage on the braking force.

Figure 6:
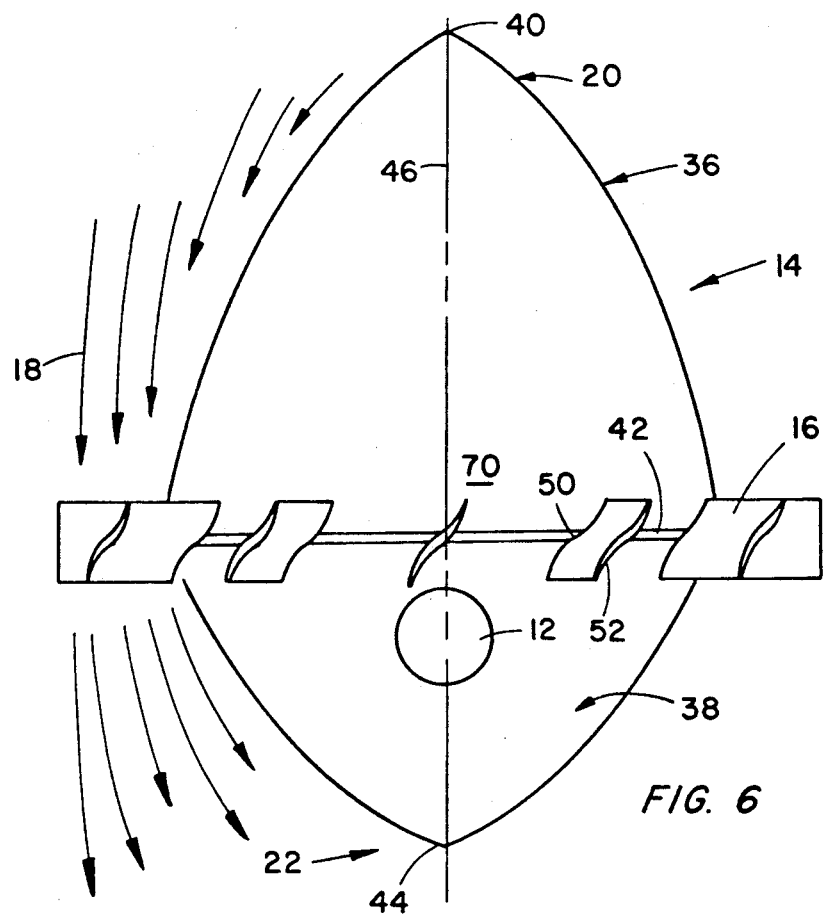
FIG. 6 illustrates a bottom view of the WECS of the present invention.

As is best illustrated in FIG. 6, the blade-supporting body 14 has a double conical shape. The double conical shape thereof includes a leading section 36 and a trailing section 38, as will be understood from the ensuing discussion, the leading section 36 is mounted on the trailing section, as by slip rings or the like, in a manner that permits that leading section to rotate with respect to the trailing section. The leading section 36 diverges from an upstream-facing apex 40 to a location of maximum diameter 42 that is located downstream of the apex 40. The trailing section 38 includes a downstream facing trailing apex 44 positioned downstream of the location of maximum diameter, and converges from the position of maximum diameter to the trailing apex. The body 14 has a longitudinal centerline 46 that extends from the leading apex 40 to the trailing apex 44. The axial length of each section is measured along the longitudinal centerline 46, and the leading section 36 has an axial length greater than the axial length of the trailing section 38. The blades 16 are fixedly mounted on the leading section axially upstream and adjacent to the position of maximum diameter and upstream of the trailing section.

The body 14 has an arcuate outer surface that is smooth and continuous from the leading apex 40 to the trailing apex 44. The smooth arcuate shape of the blade-supporting body outer surface smoothly guides the air along the axial extent of the body as indicated in FIG. 6. This smooth movement of the air smoothly accelerates the flow velocity with a positive pressure gradient in the boundary layer as the air moves from the apex 40 toward and to the location of maximum diameter 42. The smoothly arcuate outer surface of the trailing section 38 then smoothly guides the air, with an adverse pressure gradient in the boundary layer, from the location of maximum diameter 42 toward the trailing apex 44. The adverse pressure gradient existing on the trailing section tends to slow the air velocity downstream of the blades; but the momentum of the air flow will be such that the air flow energy is the greatest at the location of maximum diameter. This adverse pressure gradient will not likely to become significant until downstream of location 47. Since the blades 16 are positioned at location 42, the blades will be contacted by air having the maximum energy. This maximum energy will be imparted to the blades upon impact of the air and the blades, thereby transferring the maximum energy to the blades. The blade-supporting body is hollow, and has the outer surfaces of each section 36 and 38 angled with respect to the longitudinal axis 46. As can be seen in FIG. 6, the angle formed between the surface of section 38 and the axis 46 can be more acute than the angle formed between the outer surface of section 36 and the axis 46.

The momentum of the air flowing past the blades will carry it downstream of the location of maximum diameter, and hence, downstream of the blades, before the adverse pressure gradient acting thereon has a chance to cause separation from the body 14 or turbulence in the airstream. Thus, positioning the blades at the location of maximum diameter on the body 14 will cause the blades to be impacted by the air having the maximum flow energy, yet such positioning will be such that the air flowing by the blades is not yet subject to turbulence and drag producing forces whereby it flows smoothly adjacent to the blades.

The trailing section is shaped and sized to maintain the air flowing smoothly until well downstream of the blades, and perhaps quite close to the trailing apex 44 whereby form drag factors associated with the blade-supporting body and the blades is minimized. Such control of drag and turbulence creating factors increases the efficiency of the WECS 10 with respect to prior art devices.

The trailing section 38 is fixed to the support element 12 whereby the leading section 36 rotates with respect to the trailing section under the influence of the blades 16. As can be seen in FIG. 6, the leading section has an axial length as measured along centerline 46 that can exceed the axial length of the trailing section 38, and the support element 12 intersects the trailing section adjacent to the location of maximum diameter, but downstream of thereof. The curvature of the two sections 36 and 38 is as shown in FIG. 6, and the relative lengths of these two sections is also as shown in FIG. 6. Therefore, FIG. 6 can be intended to be to scale for the size and shape of the blade-supporting body and its elements. This scale and relative sizes gently guides the air to and past the blades while locating the blades at a position that will enable those blades to receive the maximum energy from the air while also maintaining drag and turbulence producing factors at a minimum.

The blades are best illustrated in FIGS. 6 and 7. All blades are identical, and thus the description will refer only to one blade. The blade 16 includes a proximal end 50 fixed to the blade-supporting body 14 and a distal end 52 that is spaced radially outwardly from the body 14. The blade 16 includes a longitudinal axis 54 that extends from the distal end to the proximal end thereof. Each blade further includes a leading tip 58 and a trailing tip 60, with the leading tip being located upstream of the trailing tip and the body extending from the distal end to the proximal end of the blade in a manner that is parallel with the longitudinal axis 54. The blades thus present a rectangular shape when viewed in the front or rear elevation, as indicated in FIG. 5.

As can be seen in FIG. 7, the blade 16 has a first surface 62 and a second surface 64 that extend from one tip 58 to the other tip 60 and which are separated from each other by a thickness dimension of the blade. The thickness dimension of the blade varies uniformly from a minimum value adjacent to the tip to a maximum value adjacent to the centerline 54. The blade has a thickness dimension at the tips 58 and 60 that is essentially zero.

As can be seen in FIG. 7, the surfaces 62 and 64 are both concave-convex surfaces with respect to the airflow direction 18. Thus, for example, surface 62 has a concave portion 62C extending from upstream tip 58 to adjacent the centerline 54, and a convex surface 62X extending from adjacent to the centerline 54 to the downstream tip 60. The surfaces 62C and 62X are smoothly joined together adjacent to the centerline 54 whereby a smooth shape transition is made from concave to convex at that location.

The surface 64 has a shape that is a mirror image of the surface 62 whereby, with respect to the air flow direction 18 shown in FIG. 7, surface 64 has a convex portion 64X extending from tip 58 to adjacent to the centerline 54, and a concave portion 64C extending from adjacent to the centerline 54 to the tip 60. The portions 64C and 64X are also smoothly joined adjacent to the centerline 54. The mirror image nature of the blade surface shapes cause the blade to always present a concave shape to the incoming air and a convex shape to the outgoing air for a blade movement direction BD shown in FIG. 7.

This concave-convex shape maximizes the energy transfer from the air to the blade while minimizing drag and turbulence producing factors associated with the blades. In this manner, the efficiency of the energy transfer from the wind to the WECS 10 is maximized. Minimizing the drag and turbulence producing factors also permits the WECS 10 to use a maximum number of blades thereby further increasing the power generating capabilities of the device.

Referring back to FIG. 6, it is seen that the blades 16 are oriented at a particular pitch with respect to the centerline 46. This pitch angle is indicated by the reference numeral 70 and is located in a plane parallel to the ground. This pitch angle is adjustable using means 72 indicated in FIGS. 7 and 13. Means 72 includes a rod 74 fixedly connected to the blade and extending coaxially with and along the centerline 54 between blade ends 50 and 52. The rod 74 is rotatably mounted on the blade-supporting body 14 and includes means, such as suitable gear means G and motor M, operationally connected thereto and to the output shaft OS of the motor and to control means SS in the body, to rotate that rod 74 about the centerline 54 as indicated in FIG. 13 by arrow R. Such rotation alters the pitch angle 70 of the blade. As the pitch angle changes, this information is feed back to the control system SS via feedback means FB. The control means can be manual or automatic in response to changing wind conditions. In the latter case, a wind speed measuring element A and wind direction measuring and indicating means WS will be included with the control means. As discussed above, the wind speed and direction indicators can be mounted on the blade-supporting body and connected to control systems located inside the body or mounted on the support element 12. The control system SS can be mounted in the body 14 in control housing 78. A suitable control program can be included in a microchip located in the control means SS. The chip will be programmed to control the pitch angle 70 according to a table input thereinto. An example of such a pitch angle table is presented below. The satellite generator should preferrably be driven by the main shaft 78 as indicated by the dotted lines 78D in FIG. 5. Disk D can be enlarged and/or be a gear.

| AMBIENT WIND MPH | PERIPHERAL WIND MPH | ROTOR PERIPHERAL MPH | THEORETICAL OPTIMUM PITCH ANGLE |
|---|---|---|---|
| 0 | 0 | 0 | $0°$ |
| 5.625 | 11.25 | 45 | $15.62°$ |
| 11.25 | 22.5 | 45 | $11.25°$ |
| 22.5 | 45.0 | 45 | $22.5°$ |
| 45.0 | 90.0 | 45 | $45.0°$ |
| 90.0 | 180.0 | 45 | $67.5°$ |

The exact details of the gearing and motors for the pitch changing means will not be presented as gears, such as bevel and spur gears are well known and the placement and engagement thereof with each other and with the drive shaft OS of motor M and with the rod 74 can be understood from the present disclosure.

Figure 11:
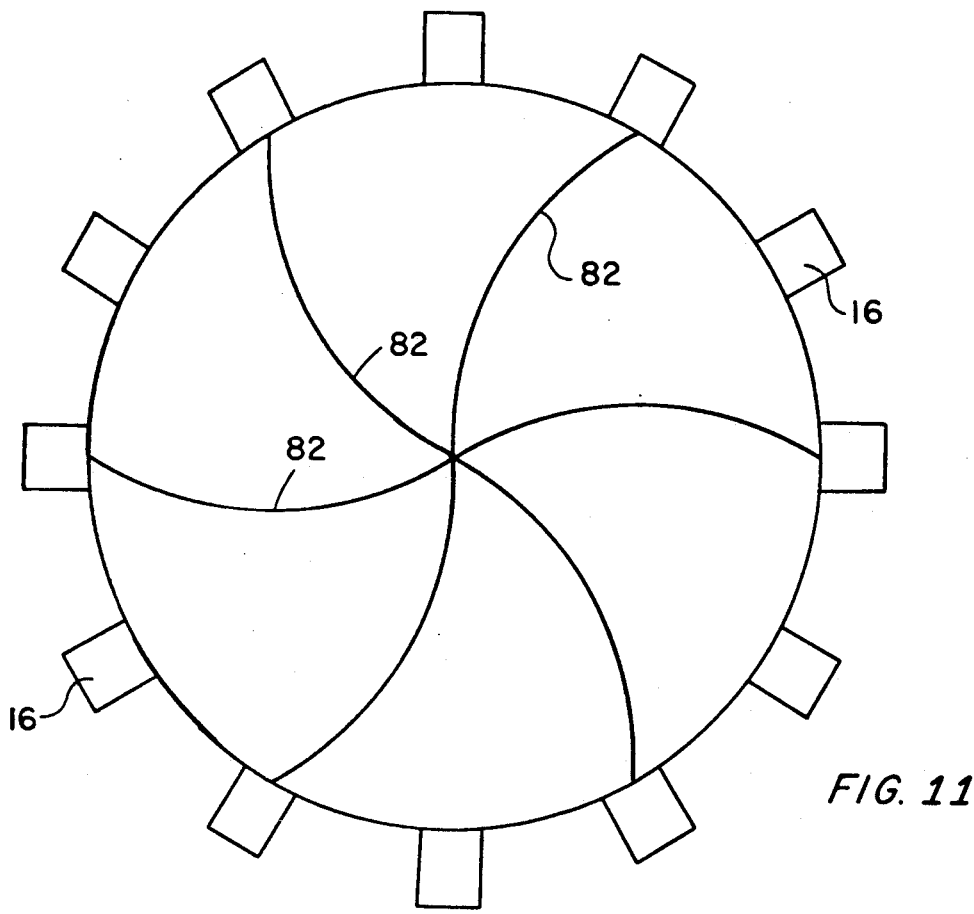
FIG. 11 illustrates an end elevational view of the FIG. 10 embodiment.
Figure 10:
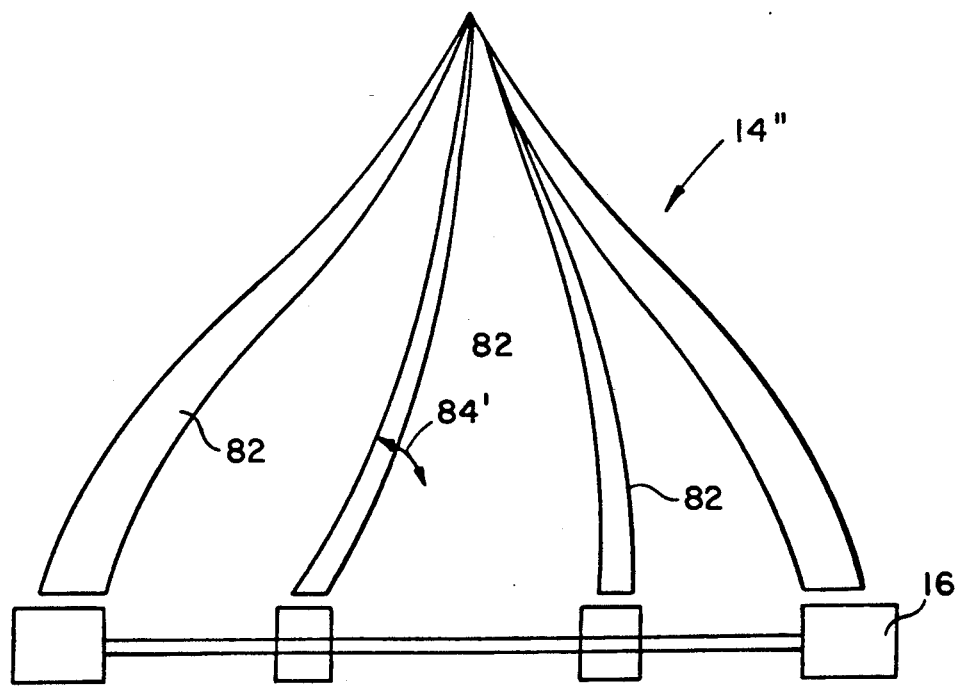
FIG. 10 illustrates an alternative embodiment of the WECS of the present invention.

Two alternative forms of the WECS are shown in FIGS. 8-11. These forms include means for further controlling air flow adjacent to the blade-supporting body outer surface. In body 14' shown in FIGS. 8 and 9, a spiral flange 80 extends around the outer surface of the body portion 36 from adjacent to the apex 40 to adjacent to the location of maximum diameter 42. The body 14" shown in FIGS. 10 and 11 includes a plurality of ribbons 82 that extend on the body portion 36 from apex 40 to adjacent to the location 42. Each ribbon extends generally along the longitudinal axis of the body, but is slightly curved as shown in FIG. 11 to accommodate the curvature of the body. The ribbons and the spiral flange guide the air past the body and toward the blades. The spiral flange and the ribbons form angles 84 and 84' respectively with the surface of the body. This angles vary from one value adjacent to the apex 40 to another, steeper, value adjacent to the location 42.

It is understood that while certain forms of the present invention have been illustrated and described herein, it is not to be limited to the specific forms or arrangements of parts described and shown.

I claim:

1. A wind energy conversion system (WECS) comprising:
    A) a support element;
    B) a blade-supporting body mounted on said support element and including
        (1) a leading portion having a conical shape with a leading apex and an outer diverging surface extending from said leading apex in a direction that is downstream of air flowing past said blade-supporting body to a location of maximum diameter,
        (2) a trailing portion having a conical shape with a trailing apex and an outer surface that converges from said location of maximum diameter to said trailing apex,
        (3) a longitudinal axis extending from said leading apex to said trailing apex,
        (4) said leading and trailing portions each having lengths measured along said longitudinal axis between said leading apex and said location of maximum diameter and between said location of maximum diameter and said trailing apex respectively,
        (5) said leading portion length exceeding said trailing portion length,
        (6) said support element intersecting said trailing portion adjacent to said location of maximum diameter,
        (7) said trailing portion being fixed to said support element, and said leading portion being rotatably connected to said trailing portion to rotate about said longitudinal axis with respect to said trailing portion,
        (8) said blade-supporting body being hollow,
        (9) an electric power generating means in said blade-supporting body and connected to said leading portion to have a portion thereof rotated as said leading portion rotates, said electric power generating means converting rotation of said leading portion into electric power, and
        (10) brake means connected to said leading portion; and C) a plurality of blades mounted on said blade-supporting body adjacent to said location of maximum diameter, each blade including
        (1) a proximal end fixed to said blade-supporting body leading portion for rotation therewith,
        (2) a distal end spaced from said blade-supporting body radially outwardly therefrom,
        (3) a longitudinal axis extending from said distal end to said proximal end,
        (4) a first tip connecting said proximal end to said distal end and extending along said blade longitudinal axis,
        (5) a second tip connecting said proximal end to said distal end and extending along said blade longitudinal axis,
        (6) a first surface extending between said blade tips and said blade ends,
        (7) a second surface extending between said blade tips and said blade ends adjacent to and spaced from said first surface,
        (8) a blade thickness measured between said blade first and second surfaces, said thickness varying from essentially zero at said blade tips to a maximum adjacent to said blade longitudinal axis,
        (9) said first surface having a concave section extending from said first tip to adjacent to said blade longitudinal axis and a convex surface extending from adjacent to said blade longitudinal axis to said second tip and smoothly connected to said concave section, and
        (10) said second surface having a convex section extending from said first tip to adjacent to said blade longitudinal axis and a concave surface extending from adjacent to said blade longitudinal axis to said second tip and smoothly connected to said convex section, said first and second surfaces being mirror images of each other with said first surface concave section being located adjacent to and matching said second surface convex surface and said first surface convex section being located adjacent to and matching said second surface concave section, and

(11) said blade being mounted on said blade-supporting body so that said blade first and second surfaces form a pitch angle with respect to a plane containing said blade-supporting body location of maximum diameter.

2. The WECS defined in claim 1 wherein said blade-supporting body leading and trailing section surfaces are arcuate.

3. The WECS defined in claim 2 wherein the outer surface of each of said body-supporting sections forms an angle with respect to said blade-supporting body longitudinal axis and the angle between the outer surface of said trailing section is more acute than the angle between said leading section outer surface and said blade-supporting body longitudinal axis.

4. The WECS defined in claim 3 further including air flow control means on said blade-supporting body leading section.

5. The WECS defined in claim 4 wherein said air flow control means includes a spiral flange.

6. The WECS defined in claim 4 wherein said air flow control means includes a plurality of ribbons extending from said leading apex to said location of maximum diameter.

7. The WECS defined in claim 3 wherein said brake means includes means for sensing air speed of air flowing past said blade-supporting body.

8. The WECS defined in claim 7 further including means for sensing air direction of air flowing past said blade-supporting body.

9. The WECS defined in claim 1 wherein each blade forms a pitch angle with air flowing past said blade-supporting body, and further including means for adjusting said pitch angle.

10. The WECS defined in claim 9 wherein said pitch angle adjusting means includes means for sensing air speed of air flowing past said blade-supporting body.

11. The WECS defined in claim 10 wherein said pitch angle adjusting means further includes means for sensing air direction of air flowing past said blade-supporting body.

12. The WECS defined in claim 11 further including means for adjusting said blade pitch angle according to a pre-set table.

* * * * *